Patented Nov. 21, 1922.

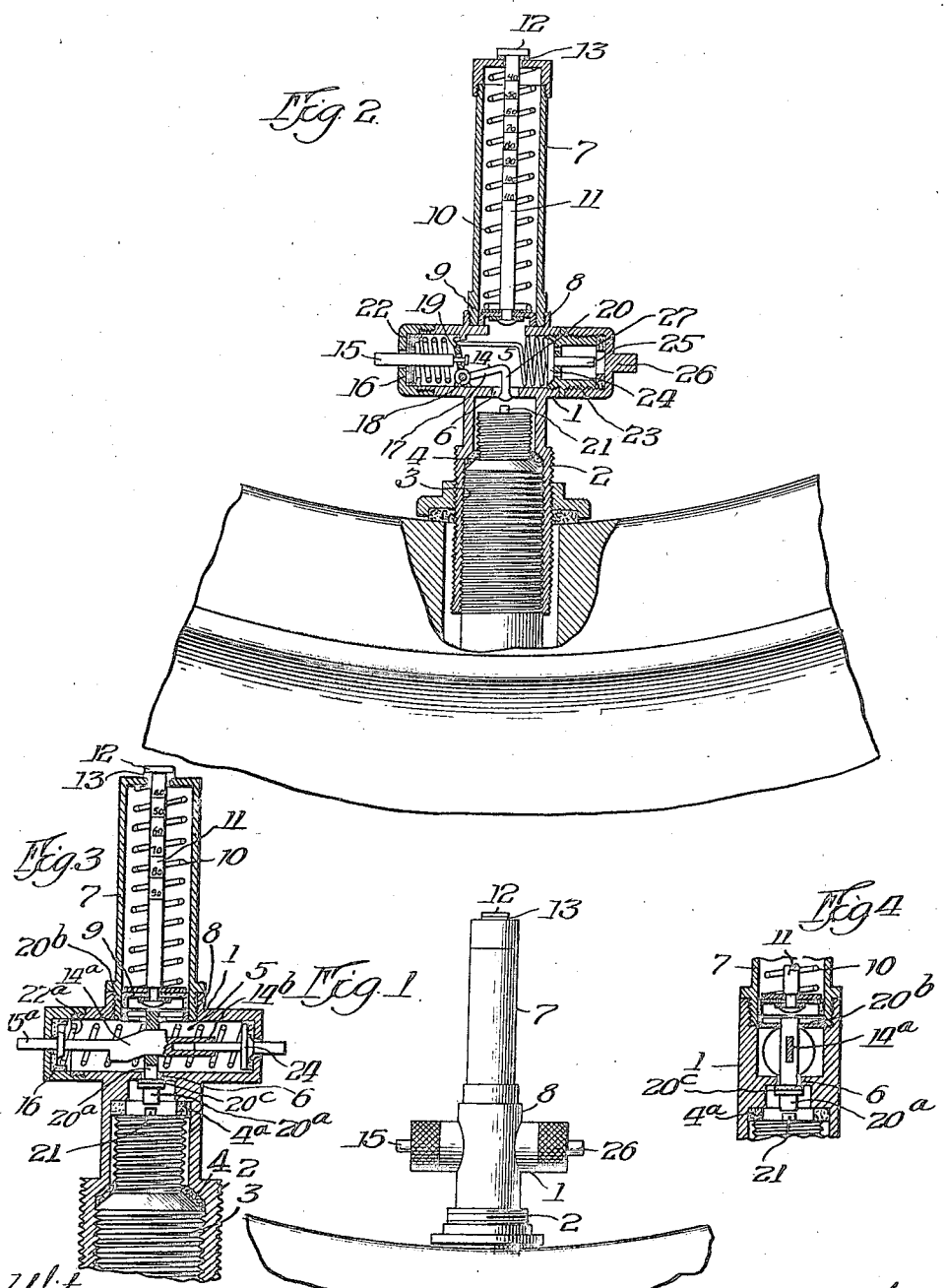

1,436,000

UNITED STATES PATENT OFFICE.

RALPH W. ZIMMERMAN, OF CHICAGO, ILLINOIS, ASSIGNOR OF ONE-THIRD TO EDWIN C. LOOMIS AND ONE-THIRD TO ALBERT M. SAXE, BOTH OF CHICAGO, ILLINOIS.

INFLATING GAUGE.

Application filed June 3, 1918. Serial No. 237,965.

*To all whom it may concern:*

Be it known that I, RALPH W. ZIMMERMAN, a citizen of the United States, residing at Chicago, in the county of Cook and State of Illinois, have invented certain new and useful Improvements in Inflating Gauges, of which the following is a specification.

This invention relates to inflating gauges through which to indicate the degree of pressure within a pneumatic device to be maintained under internal pressure, hereinafter referred to for convenience, though without limitation, as the "tire." The invention is intended primarily for embodiment in the known type of gauges which may remain attached to the charging nipple of the tire so as to be ready for use at any time and adapted to be called into play for indicating purposes by simply manipulating a key to temporarily unseat the tire valve.

The invention is preferably embodied in a type of gauge that admits of the equally well-known practice of applying the inflating medium through the gauge housing so that inflation may take place without the inconvenience of removing the gauge, and the development of pressure within the tire may be observed as it progresses, and arrested upon attainment of the desired degree of pressure.

One object of the present invention is to provide a gauge of the type described of such construction that while its pressure chamber is at all times in communication with the valve tube of the tire, the gauge will afford the same additional security against leakage which is ordinarily insured by the application of a cap over the end of the valve tube, to which end the housing of the gauge is rendered permanently airtight; and a subordinate object in this connection is to maintain this air-tight condition notwithstanding the manipulation of the means for unseating the tire valve, to which end a further feature consists in locating the unseating key in the air-tight chamber and having its manipulating end extended to the outside of the housing without destroying the aforesaid air-tight condition. In realizing these features of the invention, the housing is provided with an attaching tube that screws over the valve tube of the tire and seats against the end thereof with a suitable packing, while the pressure chamber of the housing is at all times in communication with the valve tube, and the unseating key is either in the form of a jack-lever, fulcrumed within the housing and having an opening in the housing within which is a cup plunger that permits the key to move without unsealing the housing; or in the form of a cam sliding in the line of the transverse axis of the housing and engaging through a slot in a plunger that is adapted to unseat the tire valve, this sliding cam being mounted through means of the cup plunger similarly to the jack-lever, and the unseating plunger being surrounded with a packing through which it hermetically closes communication from the valve tube of the tire. The internal pressure against this cup plunger will normally be sufficient to insure return movement of the key and lift the lever sufficiently above the valve stem to avoid contact with the latter during travel. But incidentally the cup plunger serves as an abutment for a spring that normally resists inward movement of the key and prevents vibration thereof in the travel of the vehicle which might cause it to encounter the tire valve and work a gradual leakage from the tire.

Another object of my invention is to so construct the parts that the entire gauge is rendered water-tight and dust-proof in addition to the air-tight condition of the pressure chamber, to which end the weighing tube or gauge tube is provided with a closed end through which the indicator stem works and against which the head of the indicator stem seats with an intervening packing, while the gauge tube is fitted firmly at its lower open end into a seat, preferably screw-threaded, in the housing.

A further feature consists in providing means for maintaining the air-tight condition of the gauge housing while permitting the use of its pressure chamber as a part of the inflating conduit, to which end a further feature consists in providing the pressure chamber with a threaded nipple to receive the air hose, an outwardly seating valve opening under pressure from the air hose but seating under internal pressure, and a cap for the inflating nipple provided with the usual intervening packing.

Two embodiments of the invention, which, however, are to be regarded as merely illustrative and not definitive of the scope of the invention, are shown in the accompanying drawing, in which—

Fig. 1 is an external view of the complete gauge;

Fig. 2 is an axial section of one form thereof;

Fig. 3 is a sectional view showing a modified construction of valve controlling means and method of making a hermetic closure between the tire tube and the gauge housing; and Fig. 4 is a detail view of parts shown in Fig. 3.

Referring to all the figures, 1 represents the gauge-housing which is privided with an attaching tube 2, threaded at 3, to receive the normal valve tube of the tire and having a packing 4 (Figures 2 and 3) or 4$^a$ (Figures 3 and 4) through which it seats around or upon the end of said tube when the gauge is screwed into position. The housing is constructed with a pressure chamber 5 communicating with the valve tube through the port 6, and supporting the gauge tube 7, which is preferably attached by being threaded into the flange 8 of the housing, as shown. The gauge tube contains the usual pressure piston 9, resisted by the weighing spring 10 and having the gauge stem 11 protruding through the end of the gauge tube, as shown, but seating against the end by means of its head 12 with intervening packing 13, which becomes the means for limiting downward movement of the piston 9 under the action of the spring 10, and, therefore, closes the upper end of the tube dust-tight.

Referring to Fig. 2, 14 represents the unseating key for the tire valve. An important feature of this unseating key is that it is located within the pressure chamber 5, which is maintained in air-tight condition, although said key has the protruding end 15 by which it may be manipulated by finger pressure when it is desired to know the degree of pressure within the tire. The key is preferably packed by means of a cup plunger 16 which fits within the tube of the gauge housing, while the portion of the key within the pressure chamber is preferably in the form of a jack-lever 17 fulcrumed at 18, having flexible connection 19 with the manipulating stem 15, and formed with a downturned end 20, through which it is adapted to encounter the tire valve stem 21. Another important feature of the unseating key is that it has a sufficient range of movement to act upon the valve stem, notwithstanding the widely differing positions which these valve stems assume in relation to the end of the valve tube and the maintenance of the air-tight condition of the pressure chamber. While internal pressure within the chamber 5 would ordinarily be sufficient to return the cup plunger 16 to its outer limit and hold the depressing lever 17 from the valve stem, a spring 22 is preferably seated against the cup plunger 16 to insure the inactive position of the key and resist vibration thereof, which might, with some positions of the valve stem, sufficiently disturb the valve as to permit a gradual leakage.

According to Fig. 3, the unseating key is in the form of a cam 14$^a$ working transversely through a slot in the upper end of the combined air check and unseating plunger 20$^a$ which is guided in the bushing 20$^b$ and carries packing 20$^c$ through which it closes the opening 6. The co-action between the cam 14$^a$ and the plunger 20$^a$ is such that the cam moves the plunger positively in both directions. The stem 15$^a$ of the cam 14$^a$ is provided with the cup plunger 16 as in the other form but the spring 22$^a$ is located between the inner face thereof and the valve 24 so as to serve alike for both these members. Preferably the stem of the cam 14$^a$ is provided with an extension 14$^b$ for guiding the spring 22$^a$ and this stem works in the hollow of stem 25 of valve 24. With this embodiment it will be necessary to move the unseating cam 14$^a$ inward at the time of inflation of the tire as well as when it is desired to take a reading of the tire pressure.

In order to adapt the gauge for use during inflation, the pressure chamber 5 is provided with an attaching nipple 23 to receive the ordinary air hose, and this end of the pressure chamber is closed by an outwardly seating check-valve 24, with the stem 25 in convenient reach for unseating this check-valve in case the tire is over-charged. A cap 26 with packing 27 to be applied over the nipple 23 when not in use completes the air-tight closure at this end of the gauge housing. Any suitable spring may be employed for seating the check-valve 24, but I prefer to use the spring that is employed for holding the cup plunger 16 to its outer limit, the check-valve 24 and the cup plunger 16 thus serving mutually as spring abutments for each other, and assembly of the parts being thus facilitated. Of course it will be understood that the coils of the spring are sufficiently open to permit the end 20 of the lever 17 to work through the coils.

I claim:

1. An inflating gauge for tires having an attaching tube adapted to receive the valve tube of the tire, a gauge tube alined with said attaching tube, an intermediate chamber connecting said tubes and provided with an inflating connection, a tire valve unseating plunger working transversely through said intermediate chamber in the direction of the axis of said tubes, and an actuator extending through said plunger and having cams working against the same to impart both its unseating and return movements.

2. A tire gauge comprising a housing constructed with a permanently air-tight pressure chamber, an unseating key, an operating stem for said key, an inflating port alined with said stem in said housing and having a check valve acting oppositely to said stem, and a common spring for holding said valve and key to their outer limits.

3. A tire gauge comprising an attaching tube, a valve unseating plunger in said tube, a controlling cam moving transversely to said plunger and positively moving the same in both directions and means for controlling said cam.

4. A tire gauge comprising an attaching tube, a valve unseating plunger in said tube, a controlling cam moving transversely to said plunger and positively moving the same in both directions and means for controlling said cam; said gauge also having an inflating valve arranged coaxially with the controlling cam and having a spring interposed between said inflating valve and the controlling cam.

5. A tire gauge comprising an attaching tube, a valve unseating plunger in said tube, a controlling cam moving transversely to said plunger and positively moving the same in both directions and means for controlling said cam; said gauge also having an inflating valve arranged coaxially with the controlling cam and having a spring interposed between said inflating valve and the controlling cam, and said controlling cam having its stem prolonged and working in the stem of the inflating valve.

Signed at Chicago, State of Illinois, this 29th day of May, A. D., 1918.

RALPH W. ZIMMERMAN.

Witnesses:
   Miss H. Hesterberg,
   Albert M. Saxe.